United States Patent [19]

Luck et al.

[11] 4,268,565

[45] * May 19, 1981

[54] POST-PRESS MOLDING OF MAN-MADE BOARDS TO PRODUCE CONTOURED FURNITURE PARTS

[75] Inventors: Allan J. Luck, Marengo; John T. Clarke; Michael R. Hoffman, both of St. Charles, all of Ill.

[73] Assignee: Masonite Corporation, Chicago, Ill.

[*] Notice: The portion of the term of this patent subsequent to Nov. 20, 1996, has been disclaimed.

[21] Appl. No.: 36,759

[22] Filed: May 7, 1979

Related U.S. Application Data

[60] Division of Ser. No. 819,876, Jul. 28, 1977, Pat. No. 4,175,105, which is a continuation-in-part of Ser. No. 739,184, Nov. 5, 1976, Pat. No. 4,175,150.

[51] Int. Cl.³ .................... B32B 3/30; B32B 5/14
[52] U.S. Cl. ............................ 428/161; 428/165; 428/171; 428/218; 428/524; 428/526
[58] Field of Search ............... 264/119, 120, 134, 128, 264/118, 320, 112, 113; 428/165, 771, 326, 526, 236, 301, 218; 156/285, 628, 331, 62.2, 161, 340, 219, 524, 526; 162/100

[56] References Cited

U.S. PATENT DOCUMENTS

| | | | |
|---|---|---|---|
| 1,663,503 | 3/1928 | Mason | 162/13 |
| 1,663,504 | 2/1928 | Mason | 162/101 |
| 1,663,506 | 3/1928 | Mason | 162/101 |
| 1,812,969 | 7/1931 | Mason | 162/163 |
| 1,812,970 | 7/1931 | Mason | 162/101 |
| 1,953,832 | 4/1934 | Sandell | 162/163 |
| 2,716,617 | 8/1955 | Austin, Jr. et al. | 428/526 |
| 2,872,337 | 2/1959 | Heritage et al. | 428/531 |
| 3,062,699 | 11/1962 | Raphael et al. | 428/531 |
| 3,285,801 | 11/1966 | Sarjeant | 428/221 |
| 3,539,386 | 11/1970 | Janssen | 428/541 |
| 3,562,376 | 2/1971 | Hameister et al. | 264/134 |
| 3,673,021 | 6/1972 | Joa | 156/62.8 |
| 3,699,203 | 10/1972 | Oshima | 264/113 |
| 3,758,357 | 9/1973 | Akerson et al. | 264/134 |
| 3,762,974 | 10/1973 | Wirz | 156/62.8 |
| 3,870,665 | 3/1975 | Dierk et al. | 428/423 |
| 3,927,235 | 12/1975 | Chow | 428/526 |
| 3,959,005 | 5/1976 | Bruun et al. | 106/163 R |
| 4,007,076 | 2/1977 | Clarke et al. | 264/120 |
| 4,012,561 | 3/1977 | Doughty | 428/526 |
| 4,175,150 | 11/1979 | Luck et al. | 428/171 |

Primary Examiner—Stanley S. Silverman
Attorney, Agent, or Firm—Mason, Kolehmainen, Rathburn & Wyss

[57] ABSTRACT

A cellulosic fiber containing board is molded at a temperature of at least 525° F. to provide a relatively high density skin on at least one surface.

A fibrous composition, including cellulosic fibers, is consolidated to form a blank having a density of less than 35 pounds/cubic foot. The blank is then cut to a shape larger in at least two of its three dimensions than corresponding dimensions of a mold cavity when said mold is in a closed position.

Urea is then included in at least a surface layer of fibers of the blank in an amount of at least 5% based on the dry weight of the fibers contacted with urea, and thereafter the cut blank is molded to form a contoured product having a skin on at least one surface thereof, the skin defined by a thickness of material on said surface of said product having a density greater than the material on which the skin is formed.

7 Claims, 7 Drawing Figures

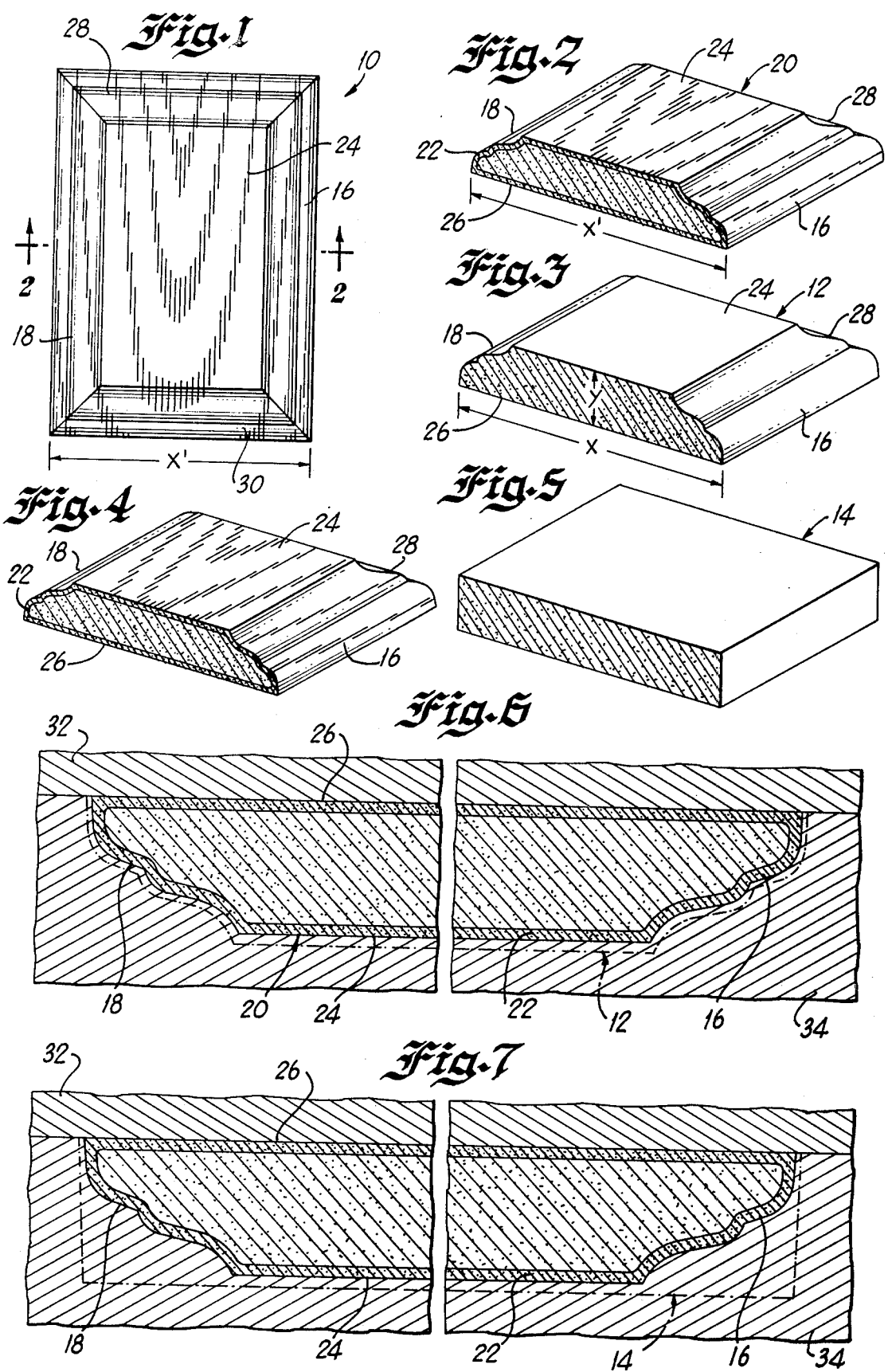

POST-PRESS MOLDING OF MAN-MADE BOARDS TO PRODUCE CONTOURED FURNITURE PARTS

CROSS-REFERENCE TO RELATED APPLICATIONS

This application is a divisional of application Ser. No. 819,876, filed July 28, 1977, now U.S. Pat. No. 4,175,105 which is a continuation-in-part of our co-pending application Ser. No. 739,184 filed Nov. 5, 1976, now U.S. Pat. No. 4,175,150 the disclosure of which is hereby incorporated by reference.

FIELD OF THE INVENTION

The present invention relates to a method of molding man-made boards to produce contoured furniture parts having relatively high density skins or surface portions thereon. More particularly, the present invention relates to a method of molding a man-made fiberboard to produce a contoured furniture part, such as a drawer front, having high density skins or surface portions as an integral part of a lower density core material. The high density skins are produced by contacting the surface fibers of a consolidated fiberboard with urea, and thereafter hot-pressing the fiberboard in a post-press or second press molding operation at a temperature of at least 525° F. to form the fiberboard into its final shape and to densify the surface portions into stiff, hard skins.

BACKGROUND OF THE INVENTION

The process of the present invention relates to a "post-press" or second press molding operation for molding a fiberboard into a desired shape while, at the same time, creating thick, hard, integral surface portions on the surfaces of a man-made fiberboard substrate. The fiberboard substrate is formed by consolidating a mass of fibers. This may be done by either the dry process or the wet process method of manufacturing fiberboard. Typical products made by these systems are medium density fiberboard and insulation board. The board is thereafter "post-pressed" in a mold having a desired configuration, to form the consolidated fiberboard into a desired shape, to impart surface texture and to form dense surface layers while retaining a lower density core or central portion of the fiberboard. For the purpose of the present invention, a "post-press molding" operation refers to a molding step performed on a consolidated fiberboard which changes the dimensions of the consolidated fiberboard on at least two dimensions.

It is necessary to form the furniture part of the present invention in two separate operations. The first operation forms a consolidated fiberboard common in the art of forming a fiberboard, such as insulation board. The second step comprises "post-press molding" which changes the dimensions of the consolidated fiberboard in at least two dimensions to correspond to the dimensions of the mold, and creates denser surface portions on the fiberboard. It is quite surprising that a "post-press molding" operation is effective in substantially altering the dimensions of the consolidated fiberboard and in densifying the surfaces of the consolidated fiberboard.

It is very difficult to both densify and restructure the surfaces of a consolidated fiberboard without destroying the fiber-to-fiber surface welds referred to in U.S. Pat. No. 4,175,150. In accordance with the present invention, it has been found that the configuration, surface density, and physical characteristics of a completely consolidated fiberboard mat can be altered in a post-press molding operation when at least the surface fibers of the mat that are contacted with urea prior to the molding. During the post-press molding operation, at a temperature of at least 525° F., the urea reacts to stiffen and strengthen the surface layers of a low density cellulosic fiberboard substrate, defined herein as fiberboard having a density in the range of 10–35 pounds/cubic foot, to provide the strength necessary for the product to be useful as a furniture part while, at the same time, restructuring the board to a desired configuration. The resulting lightweight product has a look, feel and sound equivalent to that of natural wood, while being produced at a much lower cost.

PRIOR ART

An article entitled "Wood Embossing Machines Cut Production Steps For 'Carved' Parts" appearing in Furniture Design & Manufacturing, February 1977, pages 30–33, relates to embossing materials, including fiberboard, in making furniture parts. The article does not suggest the use of urea, as disclosed herein.

An extensive search was performed to determine the prior art use of urea in the manufacture of cellulose fiber-containing substrates. Various patents and abstracts were found relating to the use of urea for fire-retardance, plasticization, resistance to aging, and as a binder. None of these patents or abstracts found, however, relates to the use of urea as disclosed herein, in post-press molding of a man-made cellulose fiber-containing product to provide a relatively high density, hard, stiff skin on one or more surfaces of a relatively low density core or center material. The relevant patents and abstracts found in the search are as follows:

| A.B.I.P.C. Abstracts | Patents |
| --- | --- |
| Vol. 36, No. 4; 2483; 1965 | 2,298,017 |
| Vol. 38, No. 6; 4917; 1967 | 2,912,392 |
| Vol. 39, No. 9; 7630; 1969 | 2,912,394 |
| Vol. 39, No. 11; 9657; 1969 | 3,285,801 |
| Vol. 41, No. 5; 4311; 1970 | 3,667,999 |
| Vol. 42, July-Dec; 5715; 1971 | 3,676,389 |
| Vol. 43, No. 9; 9665; 1973 | 3,779,861 |
| Vol. 44, No. 10; 10423; 1974 | 3,790,442 |
| Vol. 44, No. 10; 10754; 1974 | 3,881,992 |
| Vol. 45, July-Dec; 4724; 1974 | 3,915,911 |
| Vol. 45, No. 2; 1479; 1974 | 777,090 (Canada) |
| Vol. 46, No. 3; 2233; 1975 | |
| Vol. 46, No. 5; 4954; 1975 | |

SUMMARY OF THE INVENTION

An object of the present invention is to provide furniture parts made from man-made fiberboard having the look, feel and sound of natural wood.

Another object of the present invention is to provide a lightweight cellulosic fiber-containing molded furniture part or decorative molding having a hard, dense skin on at least one surface thereof.

Another object of the present invention is to provide a lightweight decorative, molded fiberboard having a central core of material with a density in the range of 10–35 pounds/ft$^3$.

Another object of the present invention is to provide a lightweight man-made molded board having design-fidelity and paint hold-out properties equal to or better than hardboards manufactured in accordance with existing technology.

Another object of the present invention is to provide a method of forming an integral, structural skin on one or more surfaces of a cellulosic fiber-containing consolidated board by including urea within at least the surface fibers of the consolidated board, and, thereafter, molding the urea treated consolidated board in a second-pressing operation at a temperature of at least 525° F.

In accordance with an important feature of the present invention, it has been found that urea will provide hard, dense surface skins to a consolidated handleable mat when the surface fibers are contacted therewith and the mat is thereafter molded at a temperature of at least 525° F.

In accordance with another important feature of the present invention, the technology disclosed herein has been developed to provide a low density, strong cellulosic fiber-containing molded product, for example, molded fiberboard which has sufficient strength for end uses such as furniture parts and decorative moldings. The low density product is produced by first manufacturing a low density substrate having strength sufficient to be handled in manufacture, including urea in at least the surface fibers of the substrate and thereafter molding the consolidated substrate to reshape the substrate and to develop dense outer layers or skins on one or more exterior surfaces.

Surprisingly, it has been found that the skin created by molding a low density consolidated fiberboard having urea in at least the outer surface fibers thereof creates a hard, dense surface which, if desired, effectively and permanently reproduces the details of the mold cavity on the surfaces of the product, permanently reshapes the fiberboard and creates a hard outer surface having excellent holdout of coating materials, such as paint.

BRIEF DESCRIPTION OF THE DRAWING

FIG. 1 is an elevational view of the front of a furniture part manufactured in accordance with the present invention.

FIG. 2 is a cross-sectional, perspective view of a molded, shaped furniture part taken along the lines 2—2 of FIG. 1 molded from the blank of FIG. 3 in accordance with the present invention.

FIG. 3 is a cross-sectional, perspective view of an oversized, shaped, low-density handleable blank which is contacted with urea and thereafter molded, as shown in FIG. 6, to produce the part shown in FIG. 2.

FIG. 4 is a cross-sectional, perspective view of a molded, shaped furniture part molded from the blank of FIG. 5 in accordance with the present invention.

FIG. 5 is a cross-sectional, perspective view of an oversized, unshaped, low-density handleable blank which is contacted with urea and thereafter molded as shown in FIG. 4.

FIG. 6 is a cross-sectional view of a closed mold during molding of the oversized, shaped, low-density handleable blank of FIG. 3 and shows the pre-molded shape of the blank in broken lines.

FIG. 7 is a cross-sectional view of a closed mold during molding of the oversized, initially unshaped, low-density handleable blank of FIG. 5 and shows the premolded shape of the blank in broken lines.

DETAILED DESCRIPTION OF THE INVENTION

Low Density Handleable Mat

In accordance with the present invention, a fiberboard product having hard, dense skins or surface portions thereon is manufactured in two steps. The first step comprises manufacturing a relatively low density consolidated, handleable mat, using either the wet or dry process as known in the manufacture of man-made boards; the second step comprises post-press molding the consolidated mat, after first treating at least the surface fibers of the mat with urea, to form a skin on the surfaces of the product. The handleable mat is produced in a desired thickness, depending upon the end use, such as a drawer front or cabinet door.

The method of producing a consolidated mat is well known as presently used in producing man-made boards such as hardboard, chipboard, particle board, panelboard, acoustical board, insulation board, and the like. In the wet process, the raw material is uniformly blended in a head box with copious quantities of water to form a slurry. The slurry is deposited onto a water-pervious support member, generally a Fourdrinier wire, where much of the water is removed leaving a wet mat of cellulosic material. The wet mat is then dryed to consolidate the fibers together, as is done in the manufacture of insulation board; or can be transferred from the pervious support member and consolidated under heat and pressure to form the board. Typically, pressures of from 400–500 psi and temperatures up to about 400° F. are encountered in hot-press consolidation of a man-made board manufactured by the wet process. The dry process is similar to the wet process except that the cellulosic fibers are first coated with a thermosetting resin binder, such as a phenol-formaldehyde resin, and are then randomly distributed into a mat by air blowing the resin-coated fibers onto a support member. In the dry process, the mat is pressed at temperatures up to about 450° F. and pressures less than about 1,000 psi to cure the thermosetting resin and to compress the mat into an integral consolidated structure.

The handleable mat produced in accordance with the first step of the present invention is manufactured in a conventional manner, using conventional cellulosic fiber stock. To achieve the full advantage of the present invention, the handleable mat should have a density, after consolidation, in the range of 10–35 pounds/cubic foot, preferably in the range of 15–30 pounds/cubic foot. Panels of varying thicknesses having densities within this range can be produced in accordance with known technology to provide lightweight core materials on which a surface skin can be developed in accordance with the following disclosure.

Handleable mats have been produced having a density as low as ten pounds/cubic foot and a thickness of one and one-half inches. Mats having densities as low as ten pounds/cubic foot are useful as the handleable mats in producing products in accordance with the principles of the present invention. In fact, in accordance with the present invention, any low density mat (less than 35 pounds/cubic foot) is considered to be handleable if it can survive the trimming, cutting, stacking, packing, shipping, and unloading operations necessary to produce fiberboard. All such handleable mats are useful in accordance with the principles of the present invention.

Blank Shaping

The low density fiberboard is cut into blanks, such as that shown in FIG. 5, slightly larger than the finished product in the dimensions in which a surface skin and/or surface design is desired. If a surface skin is required on all six sides of the finished furniture part, the blank is cut slightly larger than the finished part in all dimensions. In this manner, the furniture part is compressed during molding along the dimensions in which the blank is larger than the dimensions of a mold cavity, when the mold is in a fully closed position, to shape the blank where the blank is not initally in exact conformity with the interior dimensions of the closed mold. This compression is necessary to form a thick dense skin on the surface of the furniture part.

A consolidated fiberboard blank having a very low density on the order of 10-25 pounds/cubic foot can be substantially reshaped in the molding process so that it is not necessary to shape the blank to conform to the general interior shape of the closed mold. For example, 10-25 pounds/cubic foot low density fiberboard blanks having a rectangular shape, as shown in FIG. 5, can be molded without shaping.

With higher density consolidated fiberboard blanks having a density, for example, of 25-35 pounds/cubic foot, some material should be removed prior to molding. Consolidated fiberboard blanks having a density of about 25-35 pounds/cubic foot should be cut or routed, as known in the art of shaping natural wood furniture parts, preferably to correspond generally to the shape of the closed mold cavity, with at least two of its three dimensions slightly larger. For example, all dimensions of a 30 pounds/cubic foot blank, used to mold a shaped $15'' \times 7\frac{1}{4}'' \times \frac{3}{4}''$ drawer front, can be larger than the corresponding dimension of the closed mold in all dimensions, as shown in Table VII, to apply a dense skin to all sides of the finished drawer front. The less dense the fiberboard blank, the less closely the shape of the pre-mold blank must conform in shape to the shape of the mold cavity. For example, a fiberboard blank having a density of 25-30 pounds/cubic foot used to form a drawer front having the shape shown in FIGS. 1, 2 and 4 can be formed by first partially shaping a rectangular blank by beveling the sides edges, leaving enough extra edge material for compression during molding.

MOLDING

The consolidated fiberboard blank containing urea is post-pressed in a mold at a temperature of at least 525° F. to develop a surface layer herein called a "skin", defined as an outer layer having a higher density than a thickness of material over which it is formed. It was found in early investigations that heat and pressure alone would not form a thick skin on the surface of a low density fiberboard. Skin thickness was very thin, regardless of the temperature and degree of compression. Table I shows that post-pressing alone, without urea pre-treatment does not produce a skin.

TABLE I
Effect of Heat, Pressure and Post-Pressing On Skin Development

| Substrate | Final Caliper (In.) | Density lb/ft³ | Skin Thickness (In.) |
|---|---|---|---|
| fiberboard not post-pressed | 0.563 | 17 | 0 |
| post-pressed fiberboard (no urea) | 0.406 | 22 | 0 |
| fiberboard w/urea on all surfaces and post-pressed at 550° F. | 0.406 | 22 | 0.030 |

Various chemicals were evaluated on the surface of low density consolidated fiberboard blanks, and the skin thicknesses provided by each chemical were measured. Chemicals evaluated were phenol-formaldehyde resin, urea-formaldehyde resin, gelatin, mixtures of gelatin with phenol-formaldehyde, n-methylolacrylamide, and urea. The chemical was applied to the fiberboard blanks prior to molding. For example, urea was applied as an aqueous solution to all surfaces using a paint roller. Urea proved to be unexpectedly superior for skin development on the surface of a cellulosic fiber-containing substrate, particularly for low density (10-35 pounds/ft³) fiberboard blanks, as shown in Table II:

TABLE II
EFFECT OF CHEMICAL SURFACE SPRAY
Skin Thickness (In.) at Equivalent Cost Level

| Chemical | $5/MFt² Pounds/MFt² | Skin Thickness | $10/MFt² Pounds/MFt² | Skin Thickness | $20/MFt² Pounds/MFt² | Skin Thickness | REMARKS |
|---|---|---|---|---|---|---|---|
| urea | 55 | .026 | 111 | .032 | 222 | .033 | Tough, smooth, but poor bond between skin and mat |
| gelatin/phenol-formaldehyde | 7 | .015 | 15 | .022 | 29 | .030 | Glossy surface film |
| urea-formaldehyde | 42 | .013 | 83 | .019 | 167 | .024 | Hard surface but blistered in spots on all boards |
| n-methylolacrylamide | 7 | .014 | 14 | .017 | 27 | .018 | Tough, smooth surface with good bond to mat |
| gelatin | 6 | — | 12 | — | 25 | — | When exposed to hot platens the surface gummed up, charred, and stuck to platen |
| phenol-formaldehyde | 24 | .014 | 48 | .014 | 95 | .024 | Reddish brown flat surface, tight bond to mat |

In attempting to achieve thicker surface skins on the consolidated blanks during post-press molding it was found that urea should penetrate the surface fibers of the blank prior to post-press molding. Surface spraying therefore led to the impregnation method of incorporating urea into the blank.

Impregnation Process

It has been found that when urea is impregnated into the surface of a 10-35 pound/cubic foot consolidated fiberboard blank, a much thicker skin can be produced by vacuum impregnating the urea to provide a skin thickness in the range of 0.060 inch. Surprisingly, urea is the only chemical impregnant able to achieve a skin thickness of 0.060 inch, regardless of the depth of penetration of the impregnant.

In accordance with the results achieved as set forth in Table III, each material was applied to the surface of a 20 pounds/cubic foot consolidated fiberboard blank at an equivalent cost level and a vacuum box was utilized on the under surface of the blank to insure deep penetration of the impregnant. After impregnation, each blank was dried so that the moisture content in the mold did not exceed 10% (wet basis). The mold conditions were as follows:

| Mold Temperature | 550° F. |
|---|---|
| Closing Speed | Fast as possible |
| Holding Time at Caliper | 30 Seconds |
| Caliper | ⅝" |
| Pressure | 500 psi |
| Opening Speed | Fast as possible |

TABLE III
Effect of Impregnation

| Treatment | Caliper (In.) | Density (#/ft³) | Skin Thickness (In.) | % Increase in Skin Thickness |
|---|---|---|---|---|
| phenol-formaldehyde | .615 | 26.5 | 0.47 | 136 |
| gelatin/phenol-formaldehyde | .611 | 28.8 | .033 | 50 |
| n-methylol-acrylamide | .612 | 24.7 | .031 | 82 |
| urea formaldehyde | .633 | 25.0 | .036 | 89 |
| urea | — | — | .060 | 88 |

The surface characteristics of the low density furniture parts are superior with respect to hardness, design fidelity, and paint holdout. "Design fidelity" or simply "fidelity" as used herein is a measure of the accuracy of reproduction of the mold design onto the surface of a consolidated blank during molding. "Paint holdout" is the ability of a panel to keep paint on its surface without a significant amount striking into the panel.

Some caliper reduction of the blank on at least two of the three dimensions of the blank must result during molding to apply both heat and pressure necessary for thick skin development on each surface where such a skin is desirable. Contact (unregistrable) pressure is sufficient for slight caliper reduction. It has been found that as the fibers are compressed during the molding operation, the density increases in the outer material and, to some extent, in the core material. Thereafter, the core begins to resist compression. Accordingly, the face of the blank will compress more than the core of the oversized blank.

Closing the mold will result in varied mold pressure readings depending upon the degree that the blank is oversized and the shape of the furniture part, and the density of the blank. Consolidated blanks having a density less than about 25 pounds/cubic foot can be oversized in thickness as much as 50% while achieving sharp crisp transferrence of mold details. As the density of the blank is increased, the oversizing of the blank should be reduced to provide good design fidelity. For example, to achieve the full advantage of the present invention, blanks having a density in the range of about 25-30 pounds/cubic foot should not be oversized more than about 45% in thickness.

Table VII relates the consolidated blank size and density to the resulting mold pressure reading in molding a drawer front having the shape of the furniture part of FIG. 1. The 30-35 pounds/cubic foot blanks were each shaped as shown in FIG. 3 prior to urea impregnation and prior to molding; the blanks having a density of 24-29 pounds/cubic foot were each beveled along the edges to partially shape the blank prior to urea impregnation and prior to molding; the blanks having a density in the range of 10-23 pounds/cubic foot were not shaped prior to molding, as shown in FIG. 5.

TABLE VII
SIZE OF BLANK AND PRESSURE REQUIRED TO MAKE A DRAWER FRONT
Final Product Dimensions 0.750" × 7.250" × 15.0"

| Substrate | Density lbs/ft | Thickness (In.) | Width (In.) | Length (In.) | Pressure to Close Mold (psi) |
|---|---|---|---|---|---|
| Fiberboard | 30-35 | 0.850 | 7.281 | 15.031 | 250-400 |
| Fiberboard | 24-29 | 0.950 | 7.328 | 15.078 | 200-300 |
| Insulation Board | 10-23 | 1.125 | 7.328 | 15.078 | 150-250 |

The time of molding is not critical and preferably is in the range of 5 to 60 seconds. However, with higher temperatures in the range of 575°-650° F., it is desirable to remove the product from the mold within about 30 seconds to avoid charring or decomposition of the surface skins.

Amount of Urea

The amount of urea necessary to form a sufficient skin thickness for the purpose of the present invention is at least about 5% by weight of the fibers contacted. That is, when combined by the impregnation process, the weight percent of urea needed is at least 5% based upon the dry weight of the surface material in which the chemical has penetrated. When combined by the overlay process, the weight percent of urea needed is at least 5% based upon the dry weight of overlay material.

The maximum amount of urea which can be incorporated into the handleable mat is dependent upon the method used to make the handleable mat. Mats made by the wet process can tolerate more urea than mats made by the dry process. The type of resin used in the dry process also has an influence. Phenol-formaldehyde resin bonded blanks can be treated with higher levels of urea than blanks bonded with urea-formaldehyde resins. As the urea content of the surface layers increases, the skins become more distinct and the embossing fidelity and coating holdout improve.

To achieve the full advantage of the present invention, the urea content incorporated into the consolidated blank should be in the range of 8-35% based on the dry weight of the material contacted therewith, and preferably in the range of 10-30% by weight. When a binder other than urea-formaldehyde resin, such as phenol-formaldehyde resin, is used in forming the consolidated blank by the dry process or when a consolidated blank made by the wet process is used, the urea content has no maximum. However, no advantage is realized in terms of skin thickness or other properties by using more than about 35% urea, based on the dry weight of contacted blank material. When urea-formaldehyde is the sole binder used in forming the consolidated blank, urea can be incorporated by the overlay process in an amount not exceeding about 12% based on the dry weight of overlay material.

MOLDING CONDITIONS

A consolidated blank having a density of less than 35 pounds/cubic foot is "molded" at a temperature of at least 525° F. To achieve the full advantage of the present invention, the temperature of "molding" should not exceed 650° F. It is preferred to mold at a temperature in the range of 525°–575° F. As shown in the drawing, a molded contoured drawer front, indicated generally by reference numeral 10 is molded from a consolidated blank. The consolidated blank can be pre-shaped, as indicated generally by reference number 12 of FIG. 3, or for low density products on the order of 10–25 pounds/cubic foot, the blank can be unshaped, as designated by reference numeral 14 of FIG. 5.

Each blank must be larger than the dimensions of the mold cavity in at least two of its three dimensions to provide surface skins. The blank 12 of FIG. 3 has been shaped by routing along its opposing side edges 16 and 18 to provide a width (x-dimension) which is larger than the x' dimension in the corresponding finished part 20 (FIG. 2). These side edge surfaces 10 and 18 are then contacted with an aqueous urea solution such as by brushing on the urea solution or by application with an absorbent roller, or by any coating method known in the art.

Both of the major surfaces, top surface 24 and bottom surface 26, must be oversized and contacted with urea to prevent the furniture part from buckling. If only one major surface were contacted with urea, stresses would result from the differences in opposing surface characteristics which would cause the part to buckle or warp, along its major surfaces. However, because of the distance of separation between side surfaces 16 and 18 and because of the distance between end surfaces 28 and 30 (FIG. 1), any one of these surfaces can be urea treated without treating the corresponding opposing surface without causing buckling or warping in the part.

It is important that at least two dimensions of a three dimensional part is oversized prior to molding to achieve the compression and heat transfer in the oversized dimensions necessary to impart surface skin 22 to all surfaces which are both oversized and contacted with urea prior to molding. For example, blank 12 (FIG. 2) need only be oversized along the x and y dimensions to provide skins on top surface 24, bottom surface 26 and one or both of side surfaces 16 and 18. If desired, the end edges 28 and 30 also can be provided with surface skins.

As shown in FIG. 6, a shaped blank 12 is molded by compressing top mold portion 32 onto bottom mold portion 34 to force blank 12 into the mold and to form the shape of the molded part to correspond to the dimensions of the mold cavity.

Blank 14 can be molded directly, without preshaping, as shown in FIG. 7, so long as the blank 14 has a density of less than about 25 pounds/cubic foot. For example, a urea-contacted blank 14 having a pre-mold density of 19 pounds/cubic foot and a thickness of 1.125 inches, when molded at 550° F. for 40 seconds at 250 psi, has a postmolded density of 24 pounds/cubic foot, has excellent transference of design details from the mold cavity, includes a 0.060" skin on all surfaces, and has a look, feel and sound of natural wood.

The product formed by the process of the present invention includes a hard, dense skin having a density in the range of 40–55 pounds/ft$^3$, generally about 50 pounds/ft$^3$. The composition of the skin cannot be determined by analysis. The base layer or core material underlying the skin has a density of 10–35 pounds/cubic foot, so that lightweight products of varying density can be manufactured having hard skins thereon as thick as 0.070 inch.

Although the present invention is described in terms of particular constituents, and ranges thereof, and manner of making and using the same, it is recognized that departures may be made therefrom within the scope of the invention as defined in the appended claims.

We claim:

1. An embossed, molded furniture part having contours therein comprising a base layer comprising cellulosic fibers and a binder, said base layer having a density in the range of 10–35 pounds/ft$^3$, and an integral skin disposed on at least one face of said base layer, said skin having surface contours and having a density in the range of 40–55 pounds/ft$^3$ and formed by contacting the surface fibers of said base layer with urea, in an amount of 5–35% based on the dry weight of fibers contacted therewith, and molding said contacted surface fibers, under pressure, at a temperature of at least 525° F.

2. An embossed, molded furniture part comprising a base layer having a density of less than 35 pounds/ft$^3$ and an integral skin disposed on at least one contoured face of said base layer, said skin having a density in the range of 40–55 pounds/ft$^3$ formed by contacting the surface fibers of said base layer with urea, in an amount of at least 5% based on the dry weight of fibers contacted therewith, and hot-pressing said contacted surface fibers at a temperature of at least 525° F.

3. A multilayer unitary board having cellulosic fibers contained at least in its surface comprising a consolidated base layer having a density less than 35 pounds/ft$^3$ and an integral surface layer having a density in the range of 40–55 pounds/ft$^3$ wherein said surface layer is formed by treating said base layer with urea, in an amount of at least 5% based on the dry weight of fibers contacted therewith, and hot pressing said urea treated base layer at a temperature in the range of 525°–650° F.

4. The board as defined in claim 3 further including surface contours in said surface layer.

5. The board as defined in claim 3 wherein said surface layer includes surface contours provided by inserting said urea treated consolidated board into a mold, said mold having interior dimensions less than the dimensions of said consolidated board in at least two of its three dimensions, and closing said mold to force said consolidated board into said mold interior to re-shape said consolidated board to correspond to the dimensions of said mold interior.

6. The board as defined in claim 3 wherein said base layer has a density in the range of 10–35 pounds/ft$^3$.

7. The board as defined in claim 6 wherein said base layer has a density in the range of 10–25 pounds/ft$^3$.

* * * * *